(12) United States Patent
Wagner

(10) Patent No.: US 9,901,857 B2
(45) Date of Patent: Feb. 27, 2018

(54) FILTER ELEMENT, ESPECIALLY FOR GAS FILTRATION

(71) Applicant: Mann+Hummel GMBH, Ludwigsburg (DE)

(72) Inventor: Fabian Wagner, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 151 days.

(21) Appl. No.: 14/874,580

(22) Filed: Oct. 5, 2015

(65) Prior Publication Data

US 2016/0101382 A1    Apr. 14, 2016

(30) Foreign Application Priority Data

Oct. 13, 2014   (DE) ..................... 10 2014 014 956

(51) Int. Cl.
*B01D 46/10*     (2006.01)
*B01D 46/00*     (2006.01)

(52) U.S. Cl.
CPC ....... *B01D 46/103* (2013.01); *B01D 46/0005* (2013.01); *B01D 2265/028* (2013.01); *B01D 2265/06* (2013.01); *B01D 2275/206* (2013.01)

(58) Field of Classification Search
CPC .............. B01D 46/0005; B01D 46/103; B01D 46/125; B01D 46/522; B01D 2275/206; B01D 2265/028; B01D 2265/06
See application file for complete search history.

(56) References Cited

U.S. PATENT DOCUMENTS

2011/0067368 A1 * 3/2011 Handley .............. B01D 46/103
55/486

FOREIGN PATENT DOCUMENTS

| DE | 10201012348 A1 | 12/2013 |
| DE | 102012012347 A1 | 12/2013 |
| DE | 102013007740 A1 | 11/2014 |

* cited by examiner

*Primary Examiner* — Robert Clemente
(74) *Attorney, Agent, or Firm* — James Hasselbeck

(57) ABSTRACT

A filter element has a filter medium body with a plurality of filter segments that are joined to one another, of which at least two filter segments run adjacent and delimit an interposing intermediate space in which a support element is arranged for support on a housing component.

12 Claims, 2 Drawing Sheets

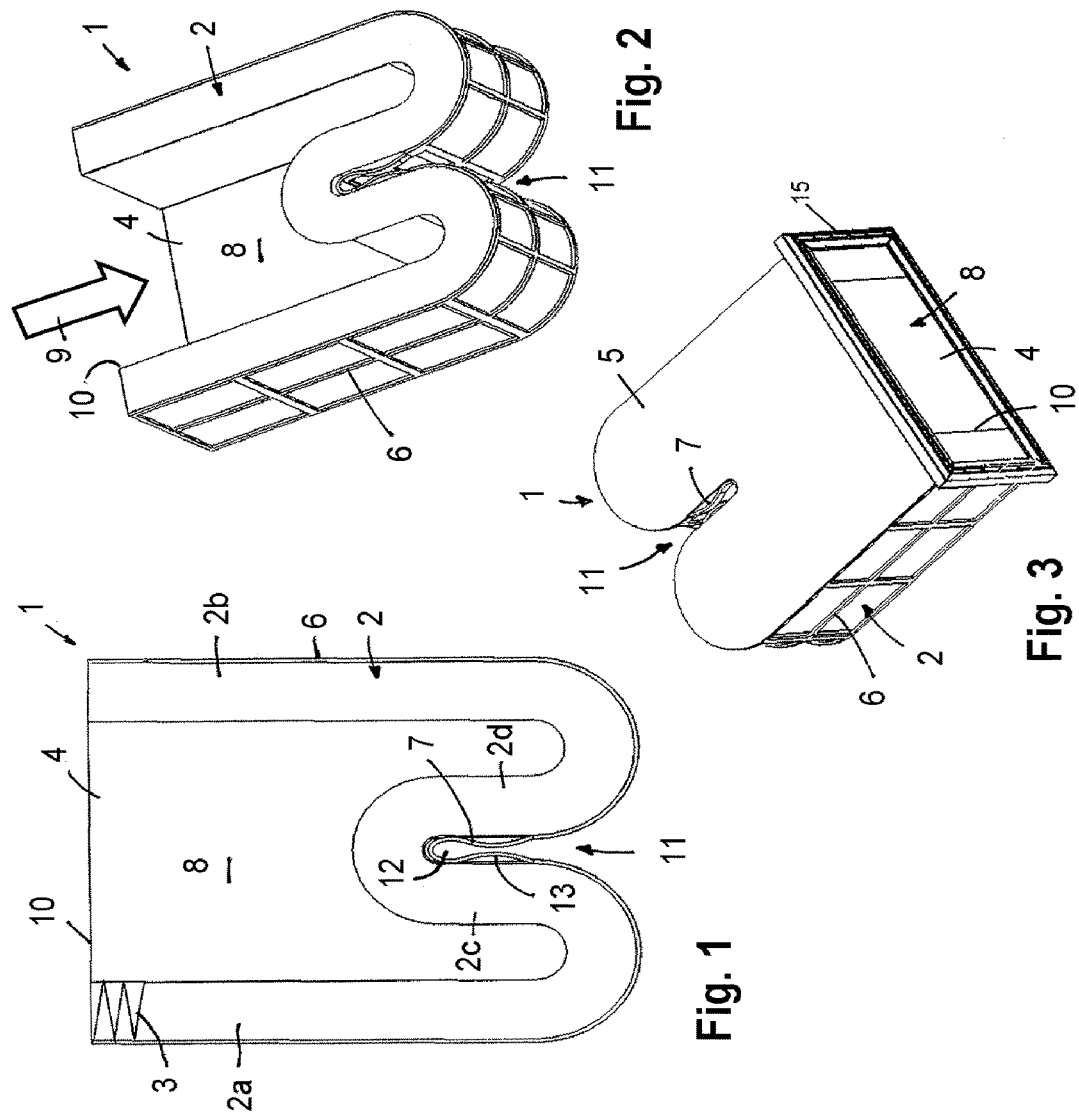

FILTER ELEMENT, ESPECIALLY FOR GAS FILTRATION

TECHNICAL FIELD

The invention relates to a filter element, especially for gas filtration, in accordance with the preamble to claim 1.

BACKGROUND

WO 2010/151580 A1 describes an air filter that includes a bellows-like filter medium body for filtering air that comprises a plurality of connecting filter segments and is wound in a meandering manner. The outer filter segments of the filter medium body are embodied elongated and delimit an admission opening for the air to be cleaned, wherein the inner filter segments of the filter medium body run in a plurality of connecting loops. The filtration surface area is enlarged by the wound embodiment of the filter medium body.

SUMMARY OF THE INVENTION

The underlying object of the invention is to embody, with simple structural means and in a stable and operationally-reliable manner, a filter element having a filter medium body made of a plurality of filter segments that are joined to one another.

The inventive filter element is preferably used for gas filtration, for instance for an air filter for filtering the combustion air to be supplied to an internal combustion engine. In principle, however, the filter element may also be used for filtering liquid.

The filter element has a filter medium body on which the filtration takes place and that is made up of a plurality of filter segments joined to one another that are not arranged in a straight line with respect to one another but instead form an angle. At least two of the filter segments are disposed relatively close to one another and delimit a interposing intermediate space in which a support element is arranged for support on a housing component. The support element in the intermediate space is connected to the filter element.

This embodiment has several advantages. First, due to the placement of the support element in the intermediate space, the closely adjacent filter segments are retained at a distance from one another so that it is provided that the fluid flows through the lateral surfaces of the filter segments and this flow is not impaired. In addition, the support element provides support on a housing component of a receiving filter housing, so that the position of the filter element in the filter housing is fixed and defined flow through the filter medium body is provided. The additional support of the filter element via the support element on the filter housing also reduces oscillations and vibrations in the filter element, which contributes to a longer service life.

The support element is preferably arranged on the outer lateral surface or circumferential surface of the filter medium body. In this way it can cooperate in a simple manner with a support element in the housing to retain the filter element.

In accordance with one useful embodiment, the support element is disposed on the outflow side of the filter medium body. Due to the difference in pressure between inflow side and outflow side, in principle there is the risk that the outflow-side outer surfaces of the adjacent filter segments will be pressed together by the difference in pressure, which would make the outflow at these filter segments more difficult. The support element on the outflow side prevents adjacent filter segments from being pressed together and ensures a minimum distance between the facing outflow-side outer sides of the adjacent filter segments. The outflow side also represents the clean side of the filter segments.

In one alternative embodiment, the support element may also be arranged on the inflow or raw side of the filter segments. Moreover, it is possible to provide a plurality of support elements that are arranged either all only on the clean side or all only on the raw side or both on the clean side and on the raw side of the filter segments, in each case in the intermediate space between adjacent filter segments.

In accordance with another useful embodiment, the support element is connected to a support grid, especially is embodied integrally with the support grid that is arranged on a lateral surface of the filter medium body. The support grid is preferably disposed on the outflow or clean side of the filter medium body; also, the support element in the intermediate space between adjacent filter segments is preferably on the clean side in this embodiment. However, embodiments are also possible with the support grid on the inflow or raw side of the filter medium body and corresponding positioning of the support element on the same side.

The two filter segments that delimit the intermediate space with the support element preferably run at least approximately parallel to one another. The two filter segments may be embodied in straight lines, wherein it is also possible to have curved embodiments. Moreover, it is also possible to provide angular arrangements of the filter segments, for instance a maximum 30° angle to one anotier, instead of a parallel or nearly parallel course. It is useful for the two filter segments to be connected, especially to be embodied integrally; the intermediate space is delimited by a connecting segment between the two filter segments.

Overall the filter medium body usefully comprises a plurality of filter segments that are integrally joined to one another, that form the filter medium body, and that are oriented in a plurality of different directions to one another, so that the result overall is approximately a W-shape. The filter segments of the filter medium are preferably formed from a connected (pleated) filter medium web. The individual filter segments may be embodied both in straight lines and also at least slightly curved. The filter segments may be equal in length or may have different lengths. When there is a W-shape, it is especially useful for the outer filter segments that form the side legs to be embodied longer than the inner filter segments, so that the outer filter segments laterally delimit a flow space for the fluid to be cleaned with an admission opening in the area of the end faces of the outer filter segments. The fluid is conducted via the admission opening and introduced into the laterally delimited flow space, at which filtration occurs on the inflow or raw side of the various filter segments. However, the flow may also possibly pass through the filter element in the reverse of this, so that the opening delimited laterally by the outer filter segments forms a discharge opening.

Filter segments that run at least approximately parallel to one another and possibly have a shorter length than the outer filter segments project into the flow space. The inner filter segments delimit the intermediate space between them, which is accessible from outside, faces the flow space, and into which the support element is placed.

In principle not only is a W-shape possible for the filter medium body, but any desired geometries having a plurality of filter segments that are arranged at an angle to one another with changes in direction. In each case, it is advantageous that the laterally outer filter segments delimit an inner flow space into which the fluid to be cleaned is introduced via an admission opening.

In accordance with another useful embodiment, end plates are arranged at each of the two axially opposing end faces or end surfaces of the filter medium body. They delimit the inner flow space axially and also seal the filter medium body in the area of the end faces.

Moreover, it is advantageous to arrange a circumferential sealing element in the area of the admission opening of the inner flow space in the filter medium body. In the embodiment with end plates, the sealing element runs along the end plate edge between the lateral, outer filter segments and on the outer contour of these filter segments in the area of the end face. The circumferential sealing element is thus a component of the filter element and is applied for instance in the form of a circumferential sealing bead. When assembled, the sealing element is positioned in a sealing manner against a receiving filter housing.

The filter medium body is embodied for instance as a pleated filter bellows, wherein the pleats extend between inflow side and outflow side.

In accordance with another useful embodiment, the support element is embodied as support clamp that has a receiving segment for the housing component on which it is supported. The receiving segment is usefully delimited in support clamp by a narrow section that must be overcome with increased force by the housing component when the filter element is introduced into the housing so that a reliable seat for the housing component is provided in the receiving segment of the support element for the filter element. The housing component on which the support element is supported is for instance a support strut that is connected to the filter housing or is embodied integrally therewith.

BRIEF DESCRIPTION OF THE DRAWINGS

Additional advantages and useful embodiments may be taken from the other claims, the description of the figures, and the drawings.

FIG. 1 is a top-view of a filter element for an air filter having a W-shaped filter medium body;

FIG. 2 is a perspective elevation of the filter element;

FIG. 3 is another perspective elevation of the filter element, having one upper end plate and one lower end plate and a circumferential sealing element on an admission opening;

In the figures, identical components are provided with the same reference numbers.

DETAILED DESCRIPTION

Figure 4:
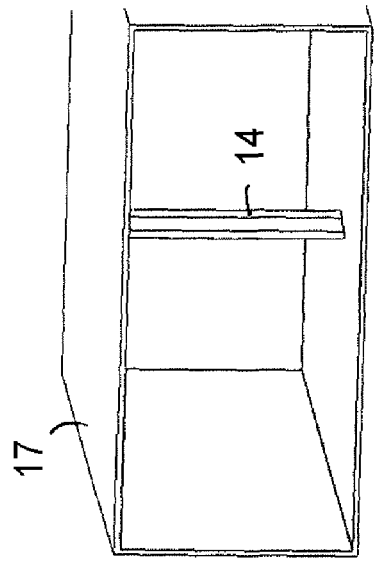
FIG. 4 is a filter device having a filter housing and a filter element placed into the filter housing in accordance with FIGS. 1 to 3.

FIGS. 1 through 3 depict a filter element 1 for a gas filter, especially an air filter for an internal combustion engine. The filter element 1 has a filter medium body 2 on which the filtration of the gas takes place and that is embodied as a pleated filter bellows (pleats 3 suggested in the drawing). End plates 4, 5 are arranged at each of the two axially opposing end faces and are joined securely and flow-tight to the specific end face of the filter medium body 2.

The filter medium body 2 is constructed in a W-shape and is made up of a plurality of connected filter segments 2a, 2b, 2c, and 2d. The two lateral, outer filter segments 2a and 2b form the side legs of the W-shaped filter medium body 2; they run parallel to one another and laterally delimit an interposing flow space 8 that is covered axially by the two end plates 4 and 5 and into which the fluid to be cleaned is introduced via an admission opening 10 in accordance with arrow 9. The admission opening 10 is disposed between the free end faces of the two lateral filter segments 2a, 2b.

Attached to the two lateral, outer filter segments 2a, 2b are inner filter segments 2c, 2d that have a shorter extension than the outer filter segments 2a, 2b. All filter segments 2a, 2b, 2c, 2d run parallel to one another and are joined to one another via curved, semi-circular segments. The two shorter, inner filter segments 2c, 2d project into the flow space 8 into which the raw fluid is conducted for filtration. The inner filter segments 2c, 2d, including the curved, connecting segments, are a maximum of half as long as the two outer filter segments 2a, 2b. All four filter segments 2a, 2b, 2c, 2d run parallel to one another.

The fluid is introduced into the flow space 8, the inner lateral surface of the filter medium body 2 delimiting the flow space 8 forms the inflow or raw side. Consequently the outer lateral surface is the outflow or clean side. Disposed on the outer lateral surface is a support grid 6 that is connected to the filter medium body 2 and is preferably produced from plastic. The support grid 6 enhances the stability of the filter medium body 2.

The two inner filter segments 2c, 2d delimit between themselves an intermediate space 11 that is separated from the flow space 8 and that is freely accessible via the outer lateral surface of the filter medium body 2 and into which is placed a support element, in the form of a support clamp 7, adjacent to the curved, connecting segment between the two filter segments 2c, 2d. The support clamp 7 is either embodied integrally with the support grid 6 or is retained on the support grid 6. The support clamp 7 supports the filter element 1 when it is installed on a housing component.

Figure 5:
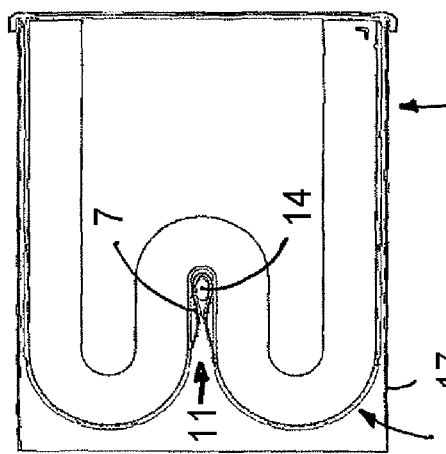
FIG. 5 is a perspective elevation of the filter housing, having a support strut for supporting the filter element.
Figure 6:
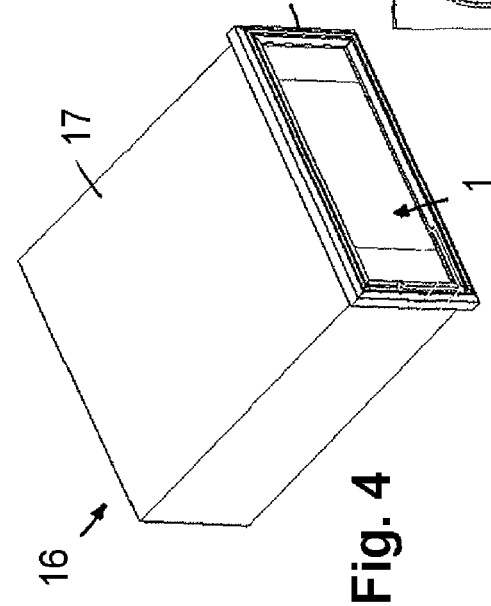
FIG. 6 is another perspective view of the filter device with a filter housing and filter element.
Figure 7:
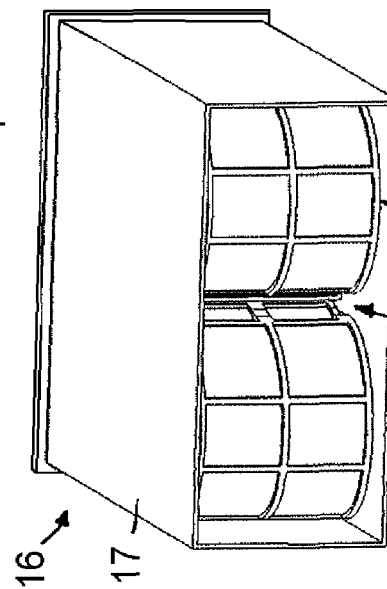
FIG. 7 is a top-view in section of the filter device with inserted filter element.

The support clamp 7 has an expanded receiving segment 12 and a narrow section 13 that has a reduced cross-section and that is disposed in front of the receiving segment 12. Via the narrow section 13, when placed into the receiving filter housing, the filter element 1 may be inserted onto a supporting housing component, which in the exemplary embodiments in accordance with FIGS. 5 and 7 is a support strut 14 in the housing. The open side of the intermediate space 11 of the filter element 1 between the two inner filter segments 2c, 2d is inserted towards the support strut 14 until the narrow section 13 has been passed and the support strut is disposed in the expanded receiving segment 12 of the support clamp 7. The narrow section 13 is embodied elastically transverse to the direction of insertion and is elastically resilient to make it possible to insert it onto the support strut 14.

Disposed on the filter element 1 in the area of the admission opening 10 of the flow space 8 is a circumferential sealing element 15 that runs on the front edge of each end plate 4, 5 and on the outer edges of the laterally outer filter segments 2a, 2b. The circumferential sealing element 15 may be arranged on a frame that projects over the end plates 4, 5 and the lateral filter segments 2a, 2b.

FIGS. 4 through 7 depict the filter device 16 and filter housing 17 for the filter device. The filter device 16 includes the filter housing 17 and the filter element 1 placed into the filter housing 17. The support strut 14, which is connected to the filter housing 17, runs in the interior of the filter housing between two delimiting, parallel walls of the filter housing. The open side of the intermediate space 11 of the filter element 1, between the filter segments 2c, 2d, is placed into the filter housing 17, wherein the support strut 14 ends up in the intermediate space 11 and, once the narrow section 13 has passed, is securely received in the receiving segment 12 of the support clamp 7.

The invention claimed is:

1. A filter element, especially for gas filtration, comprising:
   a filter medium body having a plurality of filter segments;
   wherein at least two filter segments run adjacent to one another and delimit an interposing intermediate space;
   wherein the filter medium body has a W-shape;
   wherein the two filter segments delimiting the intermediate space are arranged between outer filter segments of the filter medium body;
   wherein a support element for support on a housing component is arranged within the intermediate space;
   wherein the support element is embodied as a support clamp arranged adjacent to the at least two filter segments delimiting the interposing intermediate space, the support clamp having:
      an open end adapted for receiving a support strut when installed into the filter housing having the support strut;
      an expanded receiving section for receiving the support strut;
      a narrow section arranged between and connecting the expanded receiving section and the open end of the support clamp, the narrow section having a smaller cross section than the expanded receiving section;
      wherein the narrow section is embodied as elastic in a direction transverse to an insertion direction of the support strut into the support clamp, such that the narrow section is adapted to elastically deform to allow the support strut to pass from the open end into the expanded receiving section.

2. The filter element in accordance with claim 1, wherein the filter element includes a support grid that is arranged on a lateral surface of the filter medium body;
   wherein the support element is connected to the support grid.

3. The filter element in accordance with claim 1, wherein the two filter segments run approximately parallel to one another.

4. The filter element in accordance with claim 1, wherein the two filter segments are joined via a connecting segment of the filter medium body.

5. The filter element in accordance claim 1, wherein the at least two filter segments delimit the intermediate space as a U-shaped intermediate space.

6. The filter element in accordance with claim 1, wherein the support element is arranged on the outflow or clean side of the filter segments.

7. The filter element in accordance with claim 1, wherein the filter medium body has an admission or discharge port, laterally delimited by filter segments, for the fluid to be cleaned;
   wherein the admission or discharge port is edged with a circumferential sealing element.

8. The filter element in accordance with claim 1, wherein an end plate is arranged at each of the two opposing end faces of the filter medium body.

9. The filter element in accordance with claim 1, wherein the filter medium body is embodied as a pleated filter bellows.

10. A filter device comprising:
    a filter element including:
      a filter medium body having a plurality of filter segments,
      wherein at least two filter segments run adjacent to one another and delimit an interposing intermediate space, and
      wherein a support element for support on a housing component is arranged within the intermediate space;
    a filter housing into which the filter element is received;
    a support strut is integrally formed with the filter housing, and arranged to engage the support element of the filter element to support the filter element when the filter element is placed into the filter housing.

11. The filter device according to claim 10, wherein the filter element includes a support grid that is arranged on a lateral surface of the filter medium body;
    wherein the support element is connected to the support grid.

12. The filter device according to claim 10, wherein the filter element includes a support grid that is arranged on a lateral surface of the filter medium body;
    wherein the support element is formed integrally with the support grid.

* * * * *